Nov. 26, 1957 E. E. HARDESTY 2,814,717
RESISTANCE WELDING
Filed Dec. 13, 1954
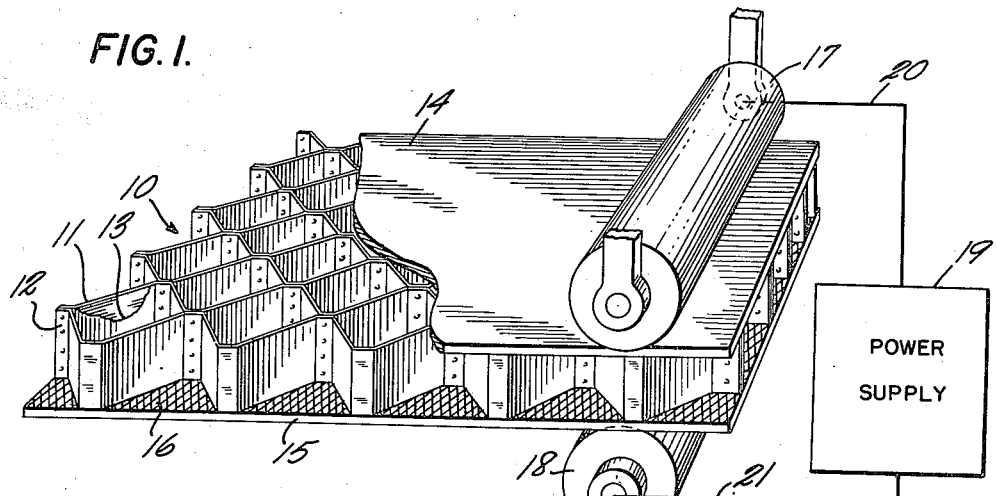
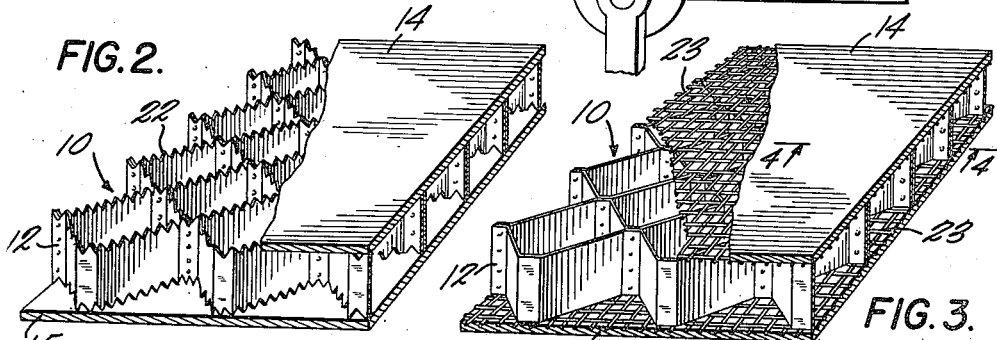
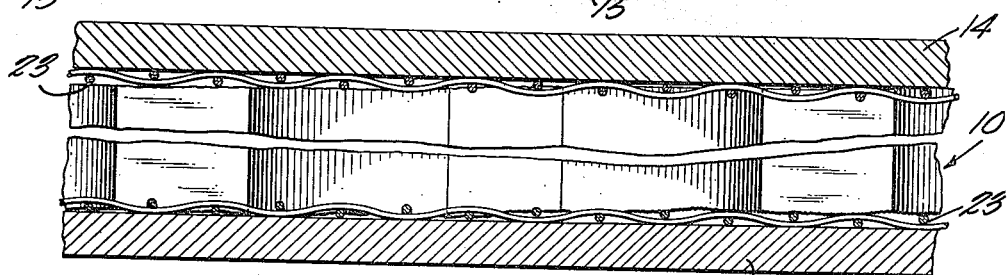
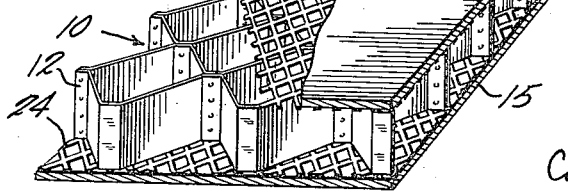
INVENTOR.
ETHRIDGE E. HARDESTY
BY
Campbell, Brumbaugh, Free & Graves
his ATTORNEYS.

United States Patent Office 2,814,717
Patented Nov. 26, 1957

2,814,717

RESISTANCE WELDING

Ethridge E. Hardesty, Balboa Island, Calif., assignor to Fairchild Engine and Airplane Corporation, Hagerstown, Md., a corporation of Maryland Application December 13, 1954, Serial No. 474,863

11 Claims. (Cl. 219—107)

This invention relates to resistance welding, and has particular reference to the welding of relatively thin sheet metal to supporting core structure.

Difficulties have been experienced in providing a strong weld between a layer of sheet metal and the edges of a supporting core structure such, for example, as honeycomb core, which imparts rigidity to the finished welded panel. For example, in the manufacture of stainless steel honeycomb sandwich, it is necessary to weld a stainless steel skin or skins to a stainless steel foil-like honeycomb core that may be formed, for example, from foil ⅓ to ⅛ the thickness of the skin. As a result of the greater thickness and area of the skin and its contact with the welding electrode, it fails to heat to the temperature of the honeycomb core resulting in an unsatisfactory bond between the pieces. On the other hand, if a large enough current is provided to heat the skins to the desired temperature, the core foil edges have a tendency to disintegrate or blow away.

Improved resistance welding methods and apparatus are disclosed in copending application Serial No. 449,306, filed August 12, 1954, by James R. Campbell, now abandoned. In that application, disposition of layers of high conductivity metal on the thin metal core is described, such high conductivity layers permitting the core to carry a far greater current than was previously possible.

The arrangement of the above-mentioned application solves many of the difficulties encountered in resistance welding of this nature. However, certain problems remain which must be overcome to provide for better and stronger welds in such work. For instance, it has been found that the surface of any honeycomb core material cannot, practically, be made absolutely flat so that it makes selective contact with the adjacent skin. This causes random spots of high current flow and, in many instances, insufficient paths through the core for the welding current. In such event, the few high density current paths burn the core cell ends away, rather than melting the skin and core together to achieve a strong weld.

The present invention overcomes the above deficiencies of resistance welding of sheet metal, such as stainless steel, to supporting elements, such as honeycomb core foil, by providing means for establishing points of electrical contact spaced in a predetermined manner between the skin and core. Such contacts, being spaced at prescribed intervals, provide for predetermined concentrations of resistance and, therefore, for a pattern of weld joints produced more efficiently and completely than if contacting metal surfaces were merely permitted to touch each other and the weld current required to pick and choose the resulting randomly spaced points of resistance.

In one embodiment of the invention, knurling, serrating, scoring, coining or the like provides an irregular surface on one face of the thin metal sheet to be welded to the foil-like supporting core. This surface, when placed in contact with the edge of the supporting core, presents peaks of metal and therefore provides spaced points of electrical resistance. When welding with this configuration, there are many current paths so that the welding current is fairly uniformly distributed over the entire core. This precludes burning and disintegration of the edges of the thin foil-like supporting core.

In another embodiment of the invention, a sawtooth like profile is provided on the exposed edges of the foil-like supporting core in order to provide points of metal which, when placed against the inner face of the thin surface skin, offer spaced points of electrical resistance. As in the first embodiment, the current divides between such resistance points to preclude burning and provide a strong weld.

In yet another embodiment of the invention, an intermediate layer comprising a thin metal web such as thin woven metal cloth or thin gauge perforated metal foil, formed from the same metal or a metal compatible with the metal used in both the skin and supporting core, is placed between them to provide evenly spaced contact points. In the manner indicated above, the evenly distributed peaks of resistance will insure a strong, efficient weld.

These and further advantages of the present invention will be more readily understood when the following description is read in connection with the accompanying drawings in which:

Figure 1 is a perspective view of irregularly surfaced metal sheets and a supporting core prepared for resistance welding in accordance with the principles of the present invention;

Figure 2 is a perspective view of metal skins and a sawtooth edged supporting core prepared for welding in accordance with the principles of the present invention;

Figure 3 is a perspective view illustrating the use of a woven metal cloth between metal sheets and a thin core in accordance with the invention;

Figure 4 is a transverse section, greatly enlarged, of the sheets, woven cloth and core shown in Figure 3 taken on the view line 4—4 looking in the direction of the arrows; and Figure 5 is a perspective view showing a perforated metal foil between metal sheets and a core in accordance with the present invention.

While the invention will be described with particular reference to the manufacture of stainless steel honeycomb sandwich, it will be understood that the principles set forth are equally applicable to resistance welding of various other structures where thin supporting members must be welded to sheet metal.

Referring to an illustrative embodiment of the invention with particular reference to Figure 1, a stainless steel honeycomb core 10 is constructed by appropriately welding formed elongated strips of stainless steel foil 11 at their points of contact 12, the cell structure being square as shown although obviously, any other suitable shape may be employed. Preferably, each of the strips 11 has a thin layer 13 of a highly conductive material disposed thereon to increase its current carrying capacity as described in the above-mentioned application. Such layer may be applied to the core material in any desired manner and may comprise a highly conductive material such as copper, silver, gold, aluminum or other like materials.

Abutting both sides of the core 10 are two stainless steel skins 14 and 15 which, together with the core 10, form what is termed a stainless steel honeycomb sandwich. Usually, the skins 14 and 15 are substantially thicker than the core foil 11. It should be noted that the thickness of the foil 11 is somewhat exaggerated for the sake of clarity. In practice, the core foil may be .002 inch thick, for example, while the stainless steel skins may range from 3 to 8 times this thickness. These dimensions are given by way of example and are not, of course, to be construed as limiting the invention.

Inner faces 16 of the skins 14 and 15 are irregularly surfaced in order to provide relatively small ridges of metal. Such surfacing may be provided by crisscross scoring, as shown in Figure 1, or by knurling, coining or any suitable method which results in raised metal ridges on the surfaces 16.

In order to weld the core 10 to the skins 14 and 15, suitably supported roller type electrodes 17 and 18 are oppositely mounted against the skins 14 and 15, respectively, and connected to a suitable power supply 19 by conductors 20 and 21. It will be understood that this description of the welding circuit is greatly simplified since ordinarily, complex timing equipment, etc., is employed for timing the welding current interval and the density of welding current.

With the core 10 and the skins 14 and 15 arranged as shown in Figure 1, the electrodes 17 and 18 may be rolled along the outer faces of the skins 14 and 15 to provide for the passage of a heavy welding current therebetween. Obviously, this heavy current will flow through the core 10.

In the absence of the irregular surfaces 16, the skins 14 and 15 would contact the edges of the core 10 at random points. These would be dependent upon the uneven configuration of the edges of the core 10 and the skins 14 and 15, since it is impossible to provide completely flat cores or skins. However, the small projecting ridges produced on the surfaces 16 will, when placed in contact with the edges of the core 10, provide many evenly spaced points of electrical resistance with the core edges. It will be understood that certain of the ridges will be dulled by the skins 14 and 15 when the sandwich is pressed together while others will merely rest against such skins to accommodate a certain amount of unevenness in the configuration of these members.

Due to the many essentially uniformly spaced points of electrical resistance between the core 10 and skins 14 and 15, the welding current will be substantially evenly distributed in passing through the core 10, precluding burning and blowing away of the edges thereof and providing for melting and welding of the core 10 and the abutting faces of the skins 14 and 15. It will be evident that this action will produce an efficient even weld resulting in a rigid honeycomb sandwich.

Referring next to Figure 2 wherein elements similar to those found in Figure 1 are designated by like reference characters, the skins 14 and 15 are disposed on both sides of the core 10. Edges 22 of the core 10 have, in order to provide spaced points of electrical resistance with the skins 14 and 15, been provided with a sawtooth profile. It should be noted that the size of the teeth formed on the edges 22 have been somewhat exaggerated in Figure 2 to clearly illustrate this embodiment of the invention. In practice, the teeth formed will be much smaller than shown and may in some applications be barely visible to the naked eye.

When welding current is passed through the sandwich illustrated in Figure 2, the spaced resistance points provided by the sawtooth profile of the edges 22 of the core 10 distribute the welding current throughout the core 10 by reason of the uniformly spaced resistance peaks. This prevents blowing away or burning of the core edges and provides for an efficient and strong weld. It will be understood that this action is similar to that described in connection with Figure 1, the projecting metal points on the edges 22 also compensating for the inherent unevenness of the skins 14 and 15 and of the surface defined by the edges of the core 10.

In the foregoing embodiment of the invention, distributed points of electrical resistance have been provided by forming metal ridges or peaks on either the skins 14 and 15 or the edges of the core 10. Turning now to the embodiment of the invention illustrated in Figure 3, the skins 14 and 15 are disposed on both sides of a core 10. Positioned between these members are layers of woven wire cloth or screening 23 formed, for example, from stainless steel wire, in the event the skins 14 and 15 and the core 10 are stainless steel. It will be evident from Figure 4 that the wire cloth 23 provides uniformly spaced points of resistance between the edges of the core 10 and the skins 14 and 15 to establish uniform spacing between weld points. This, of course, results in an even distribution of current throughout the core 10 so that burning of the core edges is minimized. The finished welded unit comprises a sandwich in which the skins 14 and 15 and the edges of the core 10 are welded at many points to the wire layer 23.

It should be noted that the layer of woven metal cloth 23 provides effective compensation for unevenness in the plane of the core edges. Thus, referring to Figure 4, it will be seen that high points of the core edges will, upon the passage of welding current which heats and melts the core edges, accommodate wires from the layer 23 therein while low points will be welded without such action. Furthermore, the over and under hills and valleys on both surfaces of the wire cloth 23 will inherently provide evenly spaced contact points between the core 10 and skins 14 and 15 to compensate for any unevenness in these members.

The embodiment of the invention illustrated in Figure 5 is similar to that found in Figures 3 and 4 but in this structure, a layer of perforated metal foil 24 is provided between the core 10 and the skins 15 and 16. The thin gauge perforated layer of metal 24, preferably with the perforations formed as shown to provide crisscross lines of metal, furnish evenly spaced points of increased resistance between the core 10 and the skins 14 and 15. As discussed in connection with the above-mentioned embodiments of the invention, this aids in distributing the current evenly through the core 10 so that the metal will melt instead of burn and provide a strong weld. It should be noted that the perforated metal layer 24 is preferably stainless steel, if such metal is used for the core 10 and skins 14 and 15, or any other metal compatible with the particular stainless steel being employed.

In each of the embodiments of the invention described above, it is preferable to employ a plated core 10, as disclosed in the above-mentioned application, in order to increase its current carrying capacity. Such an increase in the current carrying capacity, together with the improvements afforded by the present invention, permit the formation of an extremely rigid and strong honeycomb sandwich able to withstand stresses far in excess of those structures produced by conventional welding methods in the past.

It will be understood that the above-described embodiments of the invention are illustrative only and modifications thereof will occur to those skilled in the art. For example, the principles of this invention may, of course, be applied to resistance welding applications in which problems similar to those found in honeycomb sandwich are encountered. Therefore, the invention is not to be limited to the specific apparatus disclosed herein but is to be defined by the appended claims.

I claim:

1. A method of resistance welding comprising the steps of providing an irregular surface on one face of a metal sheet, abutting an edge of a thin metal supporting strip against the irregular surface, and passing a welding current through the sheet and the strip to weld them together.

2. A method of resistance welding comprising the steps of disposing an irregular thin metal web between a metal sheet and an edge of a thin metal supporting strip to provide closely adjacent resistance points therebetween, and passing a welding current through the sheet, the web and the strip to weld them together.

3. A method of resistance welding comprising the steps of providing an irregular surface on one face of a metal skin, abutting an edge of a honeycomb core formed from thin metal strips against the irregular surface, and passing a welding current through the skin and the core to weld them together.

4. A method as defined in claim 3 wherein the irregular surface comprises ridges of metal spaced in a predetermined manner on the face of the metal skin.

5. A method of resistance welding comprising the steps of disposing an irregular thin metal web between a metal skin and an edge of a honeycomb core formed from strips of thin metal to provide closely adjacent resistance points therebetween, and passing a welding current through the skin, the web and the core to weld them together.

6. A method of resistance welding comprising the steps of disposing a thin woven wire cloth between a metal skin and an edge of a honeycomb core formed from thin metal strips, and passing a welding current through the skin, the cloth and the core to weld them together.

7. A method as defined in claim 6 wherein the skin, the core and the cloth are formed from stainless steel.

8. A method of resistance welding comprising the steps of disposing a perforated sheet of stainless steel foil between a stainless steel skin and an edge of a honeycomb core formed from thin stainless steel strips, and passing a welding current through the skin, the foil and the core to weld them together.

9. An article of manufacture comprising a honeycomb sandwich formed by welding irregularly surfaced metal skins to both sides of honeycomb core formed from thin metal strips.

10. An article of manufacture comprising a honeycomb sandwich formed by welding a pair of thin irregular metal webs to a pair of metal skins, respectively, and to each side of a honeycomb core formed from thin metal strips.

11. An article of manufacture comprising a honeycomb sandwich formed by welding a pair of thin wire cloths to a pair of metal skins, respectively, and to each side of a honeycomb core formed from thin metal strips.

References Cited in the file of this patent

UNITED STATES PATENTS

| | | |
|---|---|---|
| 1,229,700 | Auel | June 12, 1917 |
| 1,677,205 | Pugh | July 17, 1928 |
| 1,712,507 | Lawson | May 14, 1929 |
| 1,783,571 | Holt | Dec. 2, 1930 |
| 1,901,176 | Lawson | Mar. 14, 1933 |
| 2,056,563 | Budd et al. | Oct. 6, 1936 |
| 2,108,795 | Budd | Feb. 22, 1938 |
| 2,256,000 | McNeil | Sept. 16, 1941 |
| 2,299,776 | Weightman | Oct. 27, 1942 |
| 2,445,801 | Partiot | July 27, 1948 |